US008694167B2

(12) United States Patent
Muhlhaus

(10) Patent No.: US 8,694,167 B2
(45) Date of Patent: Apr. 8, 2014

(54) METHOD FOR CONTROLLING VACUUM PUMPS IN AN INDUSTRIAL FURNACE COMPLEX

(75) Inventor: Thomas Muhlhaus, Emmerich (DE)

(73) Assignee: Ipsen, Inc., Cherry Valley, IL (US)

( * ) Notice: Subject to any disclaimer, the term of this patent is extended or adjusted under 35 U.S.C. 154(b) by 0 days.

(21) Appl. No.: 13/483,298

(22) Filed: May 30, 2012

(65) Prior Publication Data

US 2012/0310421 A1 Dec. 6, 2012

(30) Foreign Application Priority Data

May 31, 2011 (DE) ......................... 10 2011 103 748

(51) Int. Cl.
*G05D 7/00* (2006.01)

(52) U.S. Cl.
USPC .......................................................... 700/282

(58) Field of Classification Search
None
See application file for complete search history.

(56) References Cited

U.S. PATENT DOCUMENTS

| | | | | |
|---|---|---|---|---|
| 5,734,856 | A * | 3/1998 | Wang | 712/219 |
| 2004/0013531 | A1* | 1/2004 | Curry et al. | 417/42 |
| 2009/0112370 | A1* | 4/2009 | Tanaka et al. | 700/282 |

* cited by examiner

*Primary Examiner* — Kavita Padmanabhan
*Assistant Examiner* — Patrick Cummins
(74) *Attorney, Agent, or Firm* — Dann, Dorfman, Herrell and Skillman, P.C.

(57) ABSTRACT

Energy-efficient control of a vacuum pump having a pump controller integrated in a control and regulation device used in an industrial furnace complex is disclosed. A method and an industrial furnace complex provide incremental deactivation or activation of the vacuum pump depending on whether a vacuum is needed by using a program having one or more program steps, including a first query about whether a heat treatment process is active in the industrial furnace, a second query about whether the vacuum pump is required in a current phase of the heat treatment process, a third query about whether the vacuum pump will be required in a future phase of the heat treatment process, and/or a fourth query about whether a time until the next operation is greater than a required lead time for the vacuum pump to warm up.

13 Claims, 3 Drawing Sheets

METHOD FOR CONTROLLING VACUUM PUMPS IN AN INDUSTRIAL FURNACE COMPLEX

BACKGROUND OF THE INVENTION

1. Field of the Invention

The invention relates to an intelligent control method for vacuum pumps used in an industrial furnace complex, particularly in vacuum furnace systems. The invention also relates to an industrial furnace complex associated therewith.

2. Description of the Related Art

According to DE 10152204 B4, the stated object is to improve a vacuum gas carburising complex so as to avoid the drawbacks of not being able to monitor and record data relating to a carburising atmosphere during the carburising process.

In this context, the following steps are carried out in a method for measuring and/or regulating the carburising atmosphere inside a carburising chamber of a vacuum gas carburising system:

1.: Introducing workpieces into the carburising chamber;

2.: Creating and maintaining a vacuum in the carburising chamber;

3.: Introducing a carburising gas into the carburising chamber;

4.: Measuring the atmosphere in the carburising chamber with a vacuum-tight oxygen probe.

With this method for controlling the process gas, it is only possible to measure the current state of the furnace atmosphere regularly during the carburising phase. However, with this method it is not possible to engage or disable the vacuum pumps throughout the entire process according to the status of the process concerned.

An automated system for monitoring operational safety and controlling the process cycle in a vacuum heat treatment furnace is also known from DE 41 21 277 C2, wherein a pressure sensor for measuring the pressure in the furnace housing and at least one gas sensor arranged in the immediate vicinity of the furnace are provided. Each sensor cooperates with a separate evaluation unit to initiate a safety program if a predetermined pressure is not reached in the interior of the housing and at the same time a given gas concentration is detected in the area surrounding the furnace. This immediately causes the cooling gas inlet valve to be closed, the gas outlet valve to be opened and a purge gas inlet valve to be opened. This safety program is activated in a line that connects a purge gas reservoir with the interior of the furnace housing. The pressure in a housing interior chamber and in the area surrounding the furnace is equalised depending on the coolant gas concentration at the gas outlet valve as recorded by a gas sensor that is integrated in a branch line to the gas outlet line.

This additional safety device in a vacuum furnace with high pressure hydrogen quenching guarantees that the furnace is flushed with an inert gas if a hydrogen leak is detected and a combustible/explosive gas mixture cannot be formed. However, it does not exercise any corresponding control/regulation of the vacuum pump.

A technical search for solution options must also include an examination of the device described in EP 0524 368 B1 (similar to DE 41 21 277 C2). In this case too, automated monitoring and control of the process sequence is provided in a vacuum heat treatment furnace, particularly a furnace that is operated for the purpose of annealing metal workpieces with hydrogen under overpressure as the coolant gas. In this case, a vacuum pump is connected to housing. Gas inlet and gas outlet apertures open into the heating chamber. The system includes a motor-fan unit, a coolant gas reservoir, a heater unit and a heat exchanger in the coolant gas circuit as well as a pressure sensor measuring the pressure in the furnace housing and at least one gas sensor arranged in the immediate vicinity of the furnace, and each of these components cooperates with an evaluation unit to initiate a safety program if a predetermined pressure is not reached in the interior of the housing and at the same time a given gas concentration is detected in the area surrounding the furnace.

As described in the preceding, this program immediately causes the coolant gas inlet valve to be closed and the gas outlet valve and a purge gas inlet valve to be opened. The purge gas inlet valve is integrated in a line that connects purge gas reservoir with an interior chamber of the furnace housing and so ultimately brings about pressure equalisation between the housing interior and area surrounding the furnace depending on the coolant gas concentration registered at the gas outlet valve by a gas sensor integrated in a branch line to the gas outlet line.

Accordingly, this solution returns full circle to the document DE 41 21 277 C2 examine previously with an additional safety device for a vacuum furnace with high pressure hydrogen quenching which ensures that the furnace is flushed with an inert gas if a hydrogen leak is measured, thus guaranteeing that a combustible or explosive gas mixture cannot form.

Accordingly, the general process sequence represented in both patents also does not disclose how the vacuum pump might be controlled or regulated.

A method for regulating the vacuum in a chamber that is connected to a pump device comprising several pumps arranged in series is disclosed in DE 100 43 783 A1. In this context, at least one suction parameter is modified depending on both the high vacuum pressure present in the chamber and a predefined setpoint pressure. The change to the suction parameter is effected by using at least one regulating parameter, the regulating parameter being determined according to the high vacuum pressure that is present inside the chamber.

While this regulation of the suction power of a pump is economical in terms of energy consumption, it is not able to isolate the pumps from the recipient by means of a valve if overpressure phases occur in the vacuum furnace during high pressure gas quenching or convection operation for example.

A diaphragm or piston pump, or a combined diaphragm/piston pump with a device for pressure-dependent reduction of the suction chamber expansion speed is also described in DE 198 16 241 C1. In this device, if the aspiration pressure or control signal falls below a certain value the speed of the drive unit is adjusted automatically, the pressure or control signal and speed value pairs in this range are measured and stored, and from this is calculated the minimum suction value with which the lowest final vacuum can be achieved. On this basis, the speed of the drive unit is set to the associated optimum speed.

The disadvantage of such economical regulation of a pump's suction power by varying its suction or speed is also that the system cannot determine when the pumps are isolated from the recipient by a valve. However, this is essential in the overpressure phases that occur in a vacuum furnace (high pressure gas quenching or convection operation).

DE 699 07 890 T2 also discloses a method and device for regulating pressure in vacuum systems, in which the following steps are carried out:

Step 1: Reading a value for a desired pressure from an electronic memory that reflects a desired pressure level for the process chamber;

Step 2: Reading a value for a desired gas flow from the electronic memory that represents a desired flow of gases through the process chamber;

Step 3: Setting a choke valve in an initial position, wherein the choke valve is used to regulate the pressure in the process chamber;

Step 4: Measuring the pressure in the process chamber;

Step 5: Calculating a difference between the desired pressure and the measured pressure, and Step 6: Following the adjustment step, readjusting the choke valve at least once on the basis of the difference between the desired pressure and the measured pressure.

In this context, the readjustment is carried out using a proportional and integral regulator and the delay thereof for a specified period.

With this method and device for pressure regulation in vacuum systems, it is possible to regulate the suction power, but the "intelligence" of the system is limited by the fact that a switch-off function is not triggered in the process phases that are performed without a vacuum.

This shortcoming (no switch-off in the phases of the process that do not require a vacuum) is also not corrected by the solution suggested in JP 2008002274 A, which discloses an evacuation device for regulating the furnace pressure in the vacuum furnace by altering the speed of the vacuum pump. In order to carry out the evacuation, a first recirculation line between the pump outlet and the pump inlet is opened when the lowest speed for the vacuum pump is reached. A second recirculation line is opened if the lowest speed for the vacuum pump is reached again despite the first recirculation line being open. When the upper limit of the pump speed regulator is reached, the recirculation lines are closed. The recirculation lines are opened and closed by corresponding valves. The recirculation flow is adjusted using resistors.

A brief review of a different field such as is represented by JP 2001214868 A gives no hint as to how to ensure that the system switches off during the process phases where a vacuum does not occur. In this case, only one vacuum control unit in one furnace is provided for simply adapting the vacuum level in the furnace without increasing the size of the device and raising the vacuum pump output while the vacuum arc furnace is operating. In this case, the vacuum arc furnace is equipped with a vacuum pump that is connected to the interior of the furnace via a suction line. A vacuum atmosphere is created in the furnace housing with the shared use of a mechanical booster pump and a rotary pump. When the smelting furnace is in use, the rotating speed of the pumps is controlled by an inverter. When the suction power is altered, the vacuum is adjusted in the furnace. When the vacuum display signal reaches the controller, the inverter automatically initiates control of the pump speed.

A further consideration of U.S. Pat. No. 3,736,360 instructs one skilled in the art with control system for an electrically heated vacuum furnace. Among other devices, this system is equipped with a vacuum pump that is connected to the interior of the furnace via a suction line, and also with a plurality of heating elements for various zones and with a temperature measuring device for each zone, and with a controlled measuring instrument for the master zone. These instruments are connected to a primary furnace regulator and secondary regulators for the individual zone. A control valve in the vacuum line or a controlled cock, connected to the vacuum line, make it possible to keep the pressure in the furnace constant while the pump operates at constant speed. A pressure gauge connected to the vacuum line is also connected to the heater elements.

After evaluating this intelligent system for regulating the suction power, no provision was found for a switch-off capability for the phases without vacuum.

Based on a general survey of the evaluated prior art and practical experience in process operation of vacuum systems, "emergency devices" and "pressure regulating devices" are known that primarily use safety or pressure as a "regulating parameter. But more stringent requirements are applied to vacuum heat treatment in a modern vacuum furnace to ensure that besides the existing temperature-time sequences it is able to respond flexibly in anticipation of the pressure-time sequences.

In view of the above, it may be concluded that the problem of obtaining information about when the vacuum pumps can be shut off entirely after a certain point in time while process gas is being evacuated at certain times in a given process has not yet been solved.

BRIEF SUMMARY OF THE INVENTION

The object of the invention is to provide an intelligent method for controlling vacuum pumps used in an industrial furnace complex, particularly in vacuum furnace systems, in which the incremental deactivation or activation of the pumps throughout the entire process exerts an influence on a corresponding controller/regulator for the vacuum pump in such manner that the vacuum pumps are switched off as a function of the pressure-time sequences in the process phases in which a vacuum is not present, thus enabling the overall workflow of the treatment process to be operated as economically as possible in terms of energy consumption.

This stated object takes into account the fact that certain types of vacuum pumps require a lead time before they are ready to operate for their intended application.

According to the invention, this is solved with a method for controlling at least one vacuum pump used in an industrial furnace complex, particularly in vacuum furnace systems, and a vacuum pump controller that is integrated in a control and regulation device, in which a) the vacuum pump is deactivated or activated incrementally according to whether a vacuum is necessary or not depending on the pressure-time sequences, and b) a program is used comprising at least one of the following program steps of
   - querying whether a heat treatment process is active in the industrial furnace complex,
   - querying whether the vacuum pump is needed in the current section of the heat treatment process,
   - querying whether the vacuum pump will be required in a future section of the heat treatment process, or
   - querying whether a time until a subsequent use of the vacuum pump is longer than a required lead time for the vacuum pump.

The incremental deactivation or activation of the vacuum pump using the program in the process controller with the four logically linked program steps makes it possible to control the vacuum pumps economically in terms of energy and without extensive investment according to the features of the claims.

If the query in the first step, as to whether the process is active in the industrial furnace complex, is answered with no, the pump controller is not started, if it is answered with yes, a test of the current process phase is performed.

If the query in the second step, as to whether the vacuum pump is required in the current process phase, is answered with yes, the vacuum pump is switched on and the process query starts as described in the first step. If the query is answered with no, a test of all future process phases is performed.

If the query in the third step, as to whether the respective vacuum pump will be required in the future process phases is answered with no, the vacuum pump is switched off in order to save energy and the query is started again as described in the first step. If the query is answered with yes, the time until the pump will be required to operate is calculated and a required lead time for flawless functioning of the vacuum pump, as a warming up time so to speak, is determined immediately.

Finally, in a fourth step it is queried whether the time until the next required operation of the vacuum pump is greater than the required lead time for the pump. If the query is answered with yes, the vacuum pump is switched off to save energy, if the answer is no, the vacuum pump is switched on and the process query is restarted as described in the second step.

The sequence of the stepped queries may be integrated in a controlling and regulating device in the form of a control loop in such manner that the switching of the vacuum pump is controlled according to the relationship $Pa=S1\neg S2(\neg S3 \vee (S4(T1>T2)))$.

The industrial furnace complex, particularly the vacuum furnace system, for performing the method, comprises a heating chamber, at least one vacuum pump and a vacuum pump controller integrated in a controlling and regulating device, wherein at least one pressure sensor, at least one gas inlet, and a pump valve are provided and are connected with the vacuum pump controller having a logic circuit to enable the steps of a) querying of a status in the heat treatment process, b) querying of required operation in the current phase of the heat treatment process c) querying about the operation of the vacuum pump in the future phase of the heat treatment process, and d) querying of a difference of the time when operation of the vacuum pump will be required and a time for a necessary lead time for the vacuum pump.

Species-related industrial furnace complexes, which in certain cases comprise at least one gas discharge means, may also be operated in accordance with the method of the invention.

The invention will be described on the basis of an exemplary embodiment and with reference to the drawing.

DETAILED DESCRIPTION OF THE INVENTION

Figure 2:
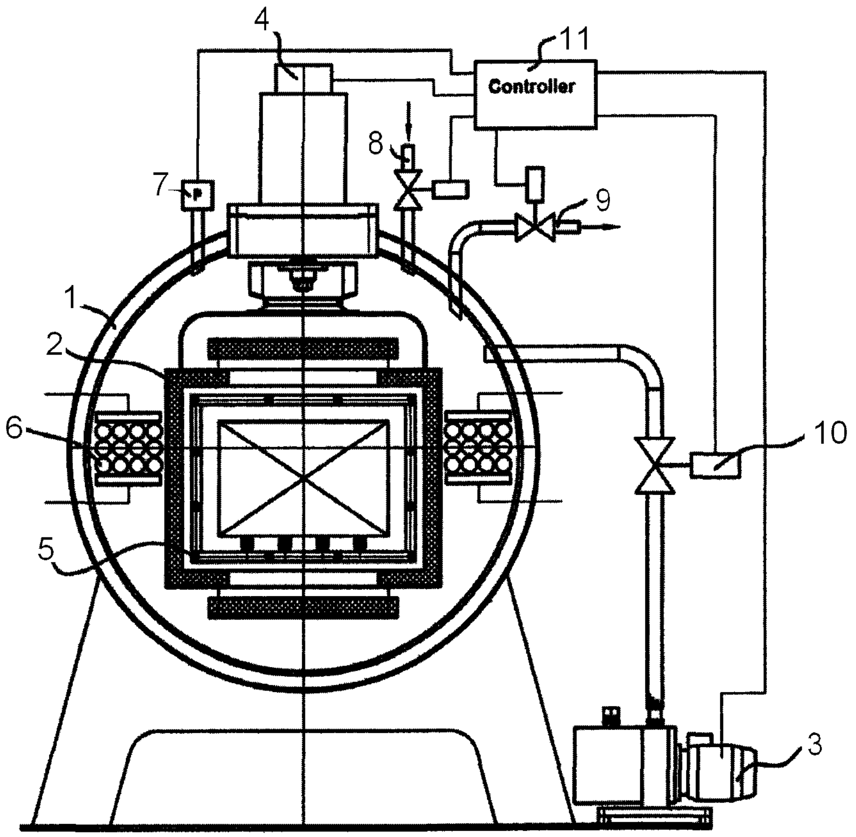
FIG. 2 is a schematic diagram of an industrial furnace complex 1 for carrying out the method.

In an industrial furnace complex 1, shown in FIG. 2, operated as a vacuum furnace system and comprising a heating chamber 2 and a vacuum pump 3 with heating unit 6, a pressure sensor 7, a gas inlet 8 and pump valve 10 are connected to a vacuum pump controller 11 having a logic circuit. A motor-fan unit 4 ensures that a coolant gas is circulated from a coolant gas reservoir 5, though this subprocess does not need to be described in greater detail here.

Figure 1A:
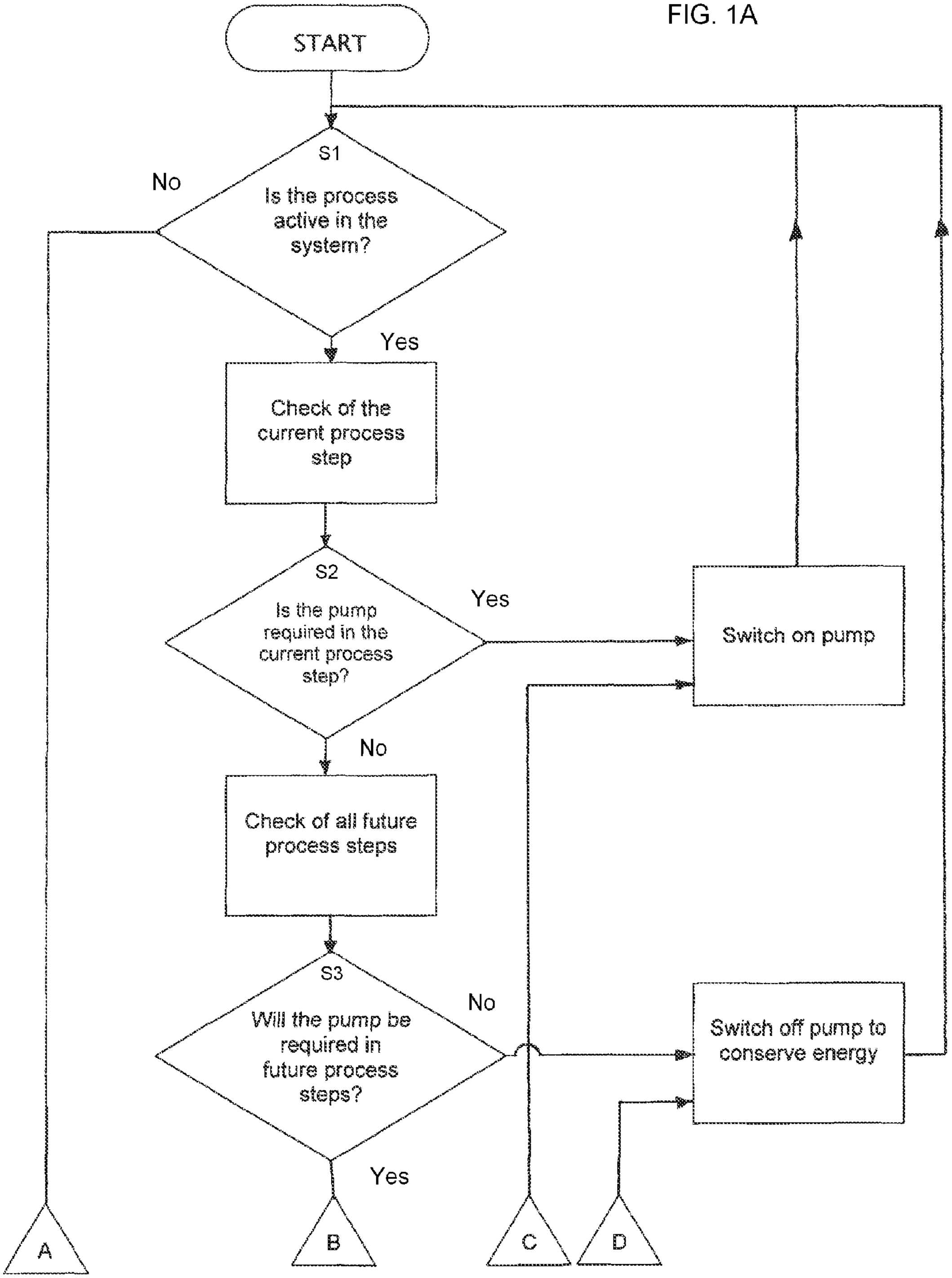
FIGS. 1A and 1B are a flowchart of the process steps according to an embodiment of the invention.
Figure 1B:
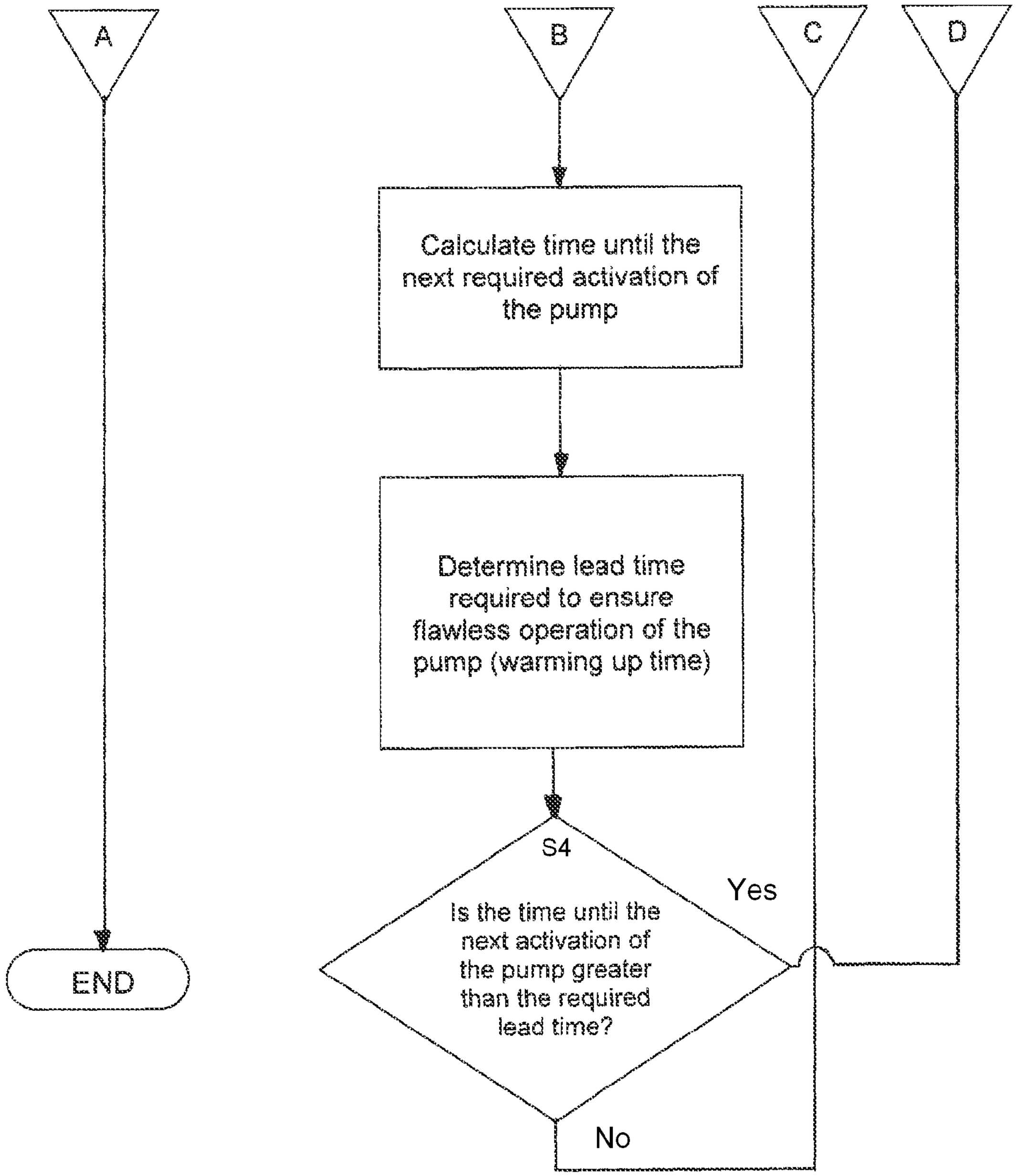

According to the method, a method for switching vacuum pump 3 off or on in steps depending on whether a vacuum is needed or not is carried out on the basis of pressure-time sequences in order to control vacuum pump 3. As shown in FIGS. 1A and 1B, to this end a program is used including the program steps of a query S1, as to whether a heat treatment process is active in industrial furnace complex 1, a query S2, as to whether vacuum pump 3 is required in a current phase of the heat treatment process, a query S3, to whether vacuum pump 3 will be required in a future phase of the heat treatment process, or a query S4 as to whether a time T1 until the next operation of vacuum pump 3 is longer than the required lead time T2 for vacuum pump 3.

Referring now to the flowchart of FIGS. 1A and 1B, there is shown a first program step in which the vacuum pump controller 11 is not started if a first query S1 is answered with "no" (S1=0). Also in the first program step, a check of the current process step and a second query S2 of the current process step take place if the first query obtains the response "yes" (S1=1).

In a second program step, vacuum pump 3 is switched on and the firth query S1 is restarted as described in the first program step if the second query S2 is answered with "yes" (S2=1). Also in the second program step a check of all future process steps is performed and a third query S3 of all future process phases is made if the second query S2 is answered with "no" (S2=0).

In a third program step, if the third query S3 is answered with "no" (S3=0), the vacuum pump 3 is switched off in order to save energy and the first query S1 is restarted as described in the first program step. Also in the third program step if the third query S3 is answered with "yes" (S3=1), a time T1 until the next required operation of vacuum pump 3 is calculated and a necessary lead time T2 is determined as the effective warming up time to enable vacuum pump 3 to function flawlessly and a fourth query S4 whether T1 is greater than T2 is performed.

In a fourth program step, if the answer to the fourth query S4 is "no" (i.e., T1≤T2) vacuum pump 3 is switched on and the query S1 is restarted as described in the first program step. However, if the answer to the fourth query S4 is "yes" (i.e., T1>T2), then the vacuum pump 3 is switched off and the query S1 is restarted.

The flowchart shows that at least one of these steps, or several of these steps, or the entire process are able to determine the control, depending on the existing condition, whether a heat treatment process is active in industrial furnace complex 1, whether vacuum pump 3 is required in a current phase of the heat treatment process, whether vacuum pump 3 will be required in a future phase of the heat treatment phase, or if time T1 until the next time vacuum pump 3 is required to operate is greater than an essential lead time T2 for vacuum pump 3.

The control of vacuum pump 3 may then be adjusted and operated in accordance with the relationship $Pa=S1\neg S2(\neg S3 \vee (S4(T1>T2)))$ in pump controller 11.

In industrial furnace complex 1, in order to carry out the method according to the invention, vacuum pump controller 11 is advantageously includes a logic circuit in a control and regulating device that is present as part of the furnace equipment. The logic circuit is programmed to execute query S1 regarding the status of vacuum pump 3 in the heat treatment process, query S2 as to whether its operation is required in the current phase of the heat treatment process, query S3 as to whether its operation will be required in a future phase of the heat treatment process and/or query S4 regarding required lead time T2 for vacuum pump 3. A pressure sensor 7, a gas inlet valve 8, and a vacuum pump valve 10 are connected with vacuum pump controller 11 to form a circuit for controlling the furnace complex 1. If necessary, industrial furnace complex 1 may also comprise a gas outlet valve 9 which is connected to the vacuum pump controller 11.

COMMERCIAL APPLICABILITY

Since the invention enables the incremental deactivation or activation of pumps throughout the entire process via intelligent controlling/regulation as a function of the pressure-time sequences, the entire heat treatment process cycle may be operated economically in terms of energy and existing systems may be retrofitted very inexpensively.

LEGEND

1=Industrial furnace complex
2=Heating chamber
3=Vacuum pump
4=Motor-fan unit
5=Coolant gas reservoir
6=Heater unit
7=Pressure sensor
8=Gas inlet valve
9=Gas outlet valve
10=Vacuum pump valve
11=Vacuum pump controller integrated in control and regulation device
Pa=Switching (on/off) of vacuum pump 3
Pa=1 Switch-off active
Pa=0 Switch-off not active
S1=Process query whether a process is active in industrial furnace complex 1
S1=1: Yes, a process is active in the complex
S1=0: No, a process is not active in the complex
S2=Process query as to whether vacuum pump 3 is required the current process phase
S2=1: Yes, vacuum pump 3 is needed in the current process phase
S2=0: No, vacuum pump 3 is not needed in the current process phase
S3=Process query as to whether vacuum pump 3 will be needed in a future process phase
S3=1: Yes, vacuum pump 3 will be needed in a future process phase
S3=0: No, vacuum pump 3 will not be needed in a future process phase
S4=Process query as to whether T1 is greater than T2
S4=1: T1>T2
S4=0: T1≤T2
T1=Time until next necessary operation of vacuum pump 3
T2=Necessary lead time before next operation for vacuum pump 3

The invention claimed is:

1. A method for controlling the operation of a vacuum pump in an industrial heat treating furnace wherein the method is implemented by executing a program running on a programmable pump controller and the method comprises the steps of:

a) determining whether a heat treatment process is active in the industrial heat treating furnace;
b) performing one of the following steps:
   i) determining whether the vacuum pump is required in a current phase of the heat treatment process when the heat treatment process is active, or
   ii) taking no action when the heat treatment process is not active;
c) performing one of the following steps when the heat treatment process is active:
   i) switching on the vacuum pump when the vacuum pump is required in the current phase of the heat treatment process, or
   ii) determining whether the vacuum pump will be required in a future phase of the heat treatment process when the vacuum pump is not required in the current phase of the heat treatment process;
d) performing one of the following steps when the vacuum pump is not required in the current phase of the heat treatment process:
   i) switching off the vacuum pump when the vacuum pump is not needed in a future phase of the heat treatment process, or
   ii) performing the following steps when the vacuum pump is required in the future phase:
      A) calculating a time T1 until the vacuum pump will be needed in the future phase,
      B) determining a lead time T2 for warming up the vacuum pump, and
      C) comparing the time T1 to the lead time T2; and then
e) performing one of the following steps when the vacuum pump is required in the future phase:
   i) switching off the vacuum pump when the time T1 is greater than the time T2, or
   ii) switching on the vacuum pump when the time T1 is not greater than the time T2.

2. The method as set forth in claim 1 comprising the step of repeating steps (a) and (b) after step (c)(i) is performed.

3. The method as set forth in claim 2 comprising the step of repeating steps (a), (b), and (c) after step (d)(i) is performed.

4. The method as set forth in claim 3 comprising the step of repeating steps (a), (b), (c), and (d) after step (e) is performed.

5. The method as set forth in claim 1 wherein step (b)(i) comprises the step of checking the current phase of the heat treatment process.

6. The method as set forth in claim 1 wherein step (c)(ii) comprises the step of checking all future steps of the heat treating process.

7. The method as set forth in claim 1 wherein the lead time T2 is long enough to ensure that the vacuum pump is ready to operate in the future phase of the heat treating process.

8. A method for controlling a vacuum pump used in an industrial furnace complex, wherein the vacuum furnace system has a pump controller that is integrated in a control and regulation device that executes a program comprising the following queries:

a first query (S1) as to whether a heat treatment process is active in the industrial furnace complex (1),
a second query (S2) as to whether the vacuum pump (3) is needed in a current phase of the heat treatment process,
a third query (S3) as to whether the vacuum pump (3) will be needed in a future phase of the heat treatment process, and
a fourth query (S4) as to whether a time (T1) until a next operation of vacuum pump (3) is greater than a required lead time (T2) for warming up the vacuum pump (3) to ensure that the vacuum pump is fully ready to operate in the process;

wherein the method comprises:

in a first program step, performing the first query (S1) and then
   not starting the vacuum pump if the answer to the first query (S1) is no (S1=0) or performing the second query (S2) if the answer to the first query is yes (S1=1), in a second program step, switching on the vacuum pump and then performing the first query (S1) if the answer to the second query is yes (S2=1) or performing the third query (S3) if the answer to the second query (S2) is no (S2=0), in a third program step, switching off the vacuum pump to save energy and then performing the first query (S1) if the answer to the third query (S3) is no (S3=0) and calculating the time (T1) and determining the time (T2) if the answer to query (S3) is yes (S3=1), and then in a fourth program step, performing the fourth query (S4) and then switching off the vacuum pump to save energy if the answer to the fourth query (S4) is yes (T1>T2) or switching on the vacuum pump and performing the first query (S1) if the answer to the fourth query is no (T1≤T2).

9. The method as recited in claim 8 wherein the method is performed by computing the logical relationship Pa=S1¬S2 (¬S3 ∨ (S4 (T1>T2))) in the pump controller (11).

10. An industrial furnace system comprising a heating chamber (2), at least one vacuum pump (3), and a pump controller (11) integrated in a control and regulation device, and the industrial furnace system further comprises a pressure sensor (7), a gas inlet (8), a gas outlet (9), and a pump valve (10) which are connected to the pump controller (11), wherein the pump controller has a logic circuit programmed to perform the process set forth in claim 1.

11. The industrial furnace system set forth in claim 10 wherein the logic circuit is programmed to perform the step of repeating steps (a) and (b) after step (c)(i).

12. The industrial furnace system set forth in claim 11 wherein the logic circuit is programmed to perform the step of repeating steps (a), (b), and (c) after step (d)(i).

13. The industrial furnace system set forth in claim 12 wherein the logic circuit is programmed to perform the step of repeating steps (a), (b), (c), and (d) after step (e).

* * * * *